United States Patent [19]

Dübal et al.

[11] Patent Number: 5,196,501
[45] Date of Patent: Mar. 23, 1993

[54] SUBSTITUTED AROMATIC POLYAMIDES AS ORIENTATION LAYERS FOR LIQUID CRYSTAL DISPLAY ELEMENTS AND LIQUID CRYSTAL SWITCHING ELEMENTS

[75] Inventors: Hans-Rolf Dübal; Mikio Murakami, both of Königstein/Taunus; Otto Herrmann-Schönherr, Bensheim; Arnold Schneller, Mainz, all of Fed. Rep. of Germany

[73] Assignee: Hoechst Aktiengesellschaft, Frankfurt am Main, Fed. Rep. of Germany

[21] Appl. No.: 808,987

[22] Filed: Dec. 17, 1991

Related U.S. Application Data

[63] Continuation of Ser. No. 415,713, Oct. 2, 1989, abandoned.

[30] Foreign Application Priority Data

Oct. 4, 1988 [DE] Fed. Rep. of Germany ....... 3833631

[51] Int. Cl.$^5$ .............. C08G 75/00; C08G 69/08; C08G 69/12; C08G 69/26

[52] U.S. Cl. .................... 528/171; 528/173; 528/183; 528/185; 528/193; 528/208; 528/220; 528/229; 528/310; 528/331; 528/336; 528/338; 528/339; 528/341; 528/344; 528/347; 528/348; 528/349; 528/350; 428/1; 428/474.4

[58] Field of Search .............. 528/171, 173, 183, 185, 528/349, 208, 347, 339, 348, 341, 344, 193, 220–229, 310, 331, 336, 338, 350; 428/1, 474.5

[56] References Cited

U.S. PATENT DOCUMENTS

| | | | |
|---|---|---|---|
| 3,049,518 | 8/1962 | Stephens | 528/348 |
| 4,221,903 | 9/1980 | Elfert et al. | 528/348 |
| 4,539,393 | 9/1985 | Tamura et al. | 528/344 |
| 4,946,934 | 8/1990 | Fenoglio et al. | 528/344 |
| 4,980,504 | 12/1990 | De Jonge et al. | 528/350 |

FOREIGN PATENT DOCUMENTS 58-37621 3/1983 Japan.

Primary Examiner—John Kight, III
Assistant Examiner—P. Hampton-Hightower
Attorney, Agent, or Firm—Curtis, Morris & Safford

[57] ABSTRACT

Preparation of specially substituted aromatic polyamides containing structural units of the formula I mentioned and copolyamides containing at least 10 mol % of structural units of the formula I and structural units of the formula II mentioned and their use as orientation layer in liquid crystal display elements and/or liquid crystal switching elements.

8 Claims, No Drawings

SUBSTITUTED AROMATIC POLYAMIDES AS ORIENTATION LAYERS FOR LIQUID CRYSTAL DISPLAY ELEMENTS AND LIQUID CRYSTAL SWITCHING ELEMENTS

This application is a continuation of application Ser. No. 07/415,713, filed Oct. 2, 1989 now abandoned.

DESCRIPTION

The combination of the effects of unusual anisotropic and fluid properties of liquid crystals has led, as is known, to the use of liquid crystals in a plurality of electro-optical switching and display devices. In these, the electrical, magnetic, elastic or thermal properties of liquid crystals can be utilized to change the orientation. Optical effects can then be achieved by means of birefringence ("birefringence mode"), incorporation of dyes ("guest/host mode") or light scattering. To this end, not only nematic but also smectic liquid crystal phases have previously been used. Examples of these types of switching and display devices are already known from many patent and specialist publications.

Common components of all liquid crystal switching devices and liquid crystal display devices are, inter alia, support plates, for example made of glass or plastic, coated with transparent electrodes and an orientation layer. Other components are spacers, adhesive-coated frames, polarizers, and for color displays thin color filter layers. Further possible components are antireflection, passivation, compensation and barrier layers and electrical non-linear elements, such as, for example, thin film transistors (TFT) and metal/insulator/metal (MIM) elements. The design of liquid crystal displays has already been described in detail in the relevant monographs (cf. e.g. E. Kaneko, "Liquid Crystal TV Displays: Principles and Applications of Liquid Crystal Displays", KTK Scientific Publishers, 1987, pages 12–30 and 163–172).

Of the abovementioned components, the orientation layer, among other components, is of particular importance. As is known, its function is to ensure a uniform defect-free alignment of the longitudinal axis of the molecules and thus a high contrast. It can consist of organic polymers or, in some cases, even of inorganic layers.

Layers of organic polymers are usually applied to the areas to be coated in the form of polymer solutions or solutions of soluble polymer precursors by printing, spraying, dipping or spin-coating and then cured—in general by heating the wet film. To achieve an orienting effect, the hard polymer layer obtained is "stroked" by means of a velvet-like coated or velvet-lined roller, a brush or similar devices, which roughens the polymer surface preferably in a straight-line or in the direction of orientation.

It was now the object of the invention to provide suitable orientation layers for liquid crystal displays which can be cured at relatively low temperatures, i.e. below 200° C., have good adhesion on the base support and high transparency and allow a particularly uniform orientation not only of smectic but also of nematic liquid crystals.

To produce electrooptical switching and display elements based on liquid crystals, polyimides, polyvinyl alcohols and certain, preferably aliphatic, polyamides (nylon) have already been used for orientation layers. Today, polyvinyl alcohol is hardly used any longer for the mass production of liquid crystal displays due to difficulties with aging. In most commercial polyimide precursors, the imidization temperatures of the starting polyamido-carboxylic acids are above 350° C. It is true that such high reaction temperatures are acceptable for conventional LCD applications, i.e. small-area black/white displays, such as, for example, for watches, pocket calculators etc., but they are detrimental to large area LCDs, such as, for example, television and computer screens etc. The reason for this is, on the one hand, that the glass supports which are coated with indium/tin oxide may be bent at such high temperatures and, on the other hand, the risk of thermal destruction of color filters and thin film transistors which can start above 200° C. It is true that these risks in general do not occur with soluble polyimides, but soluble polyimides have only insufficient adhesion on glass or on the glass supports which are coated with indium/tin oxide, as a result of which an additional process step, namely the application of an adhesion promoter, becomes necessary. It is true that in contrast no adhesion and temperature problems are encountered, for example, with aliphatic polyamides, but the required solvents—for example cresol or formic acid—are very difficult to handle under the process conditions which must be adhered to, i.e. working in a pure atmosphere, since they require special waste air installations or hoods and the complicated and expensive supply of temperature-controlled fresh air. In this case, for example, the use of N-methylpyrrolidone (b.p. 206° C.) or similar compounds would be advantageous as solvents; however, for example, aliphatic polyamides are insoluble or not sufficiently soluble in these solvents.

Japanese Patent 58/37,621 (priority date: Aug. 13, 1981) has disclosed aromatic polyamides which can be used as polymer material for orientation layers and contain structural units of the formula (a)

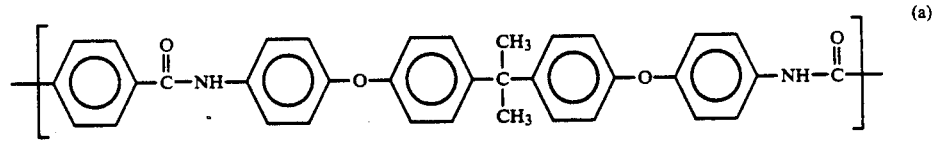

(a)

These aromatic polyamides are also inadequate in various respects as polymer material for orientation layers. They lack, for example, transparency and the required film hardness and in particular the contrast effect obtainable with them, so that the products have only limited use for the intended purpose.

Surprisingly, it has now been found that highly transparent, firmly adhesive orientation layers which are curable at temperatures below 200° C. and can be applied in N-methylpyrrolidone solution can be obtained not only for smectic but also for nematic liquid crystals by using specially substituted aromatic polyamides which contain structural units of the formula I shown below as the polymer.

The invention accordingly relates to the use of substituted aromatic polyamides which contain structural units of the formula I

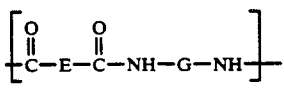
(I)

as orientation layer in liquid crystal display elements and liquid crystal switching elements, in which in formula I the units E and G have the following meaning:

E is

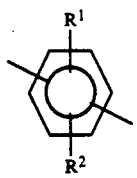

where $R^1$, $R^2$, which can be identical or different, are H, $(C_1-C_6)$-alkyl, preferably $(C_4-C_6)$-alkyl, $(C_1-C_6)$-alkoxy, preferably $(C_4-C_6)$alkoxy, with the proviso that at least one of the radicals $R^1$ or $R^2$ contains a tertiary substituted carbon atom, preferably the group $—C(CH_3)_3$, or E is

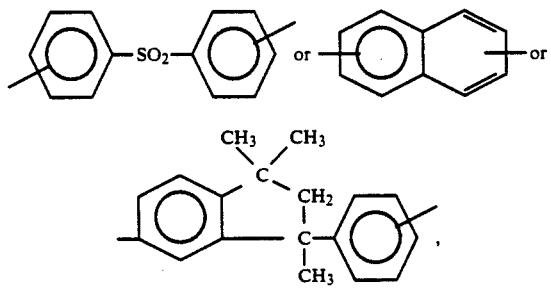

and

G is

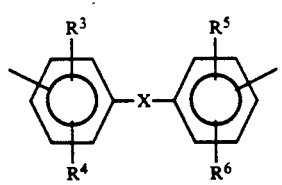

where $R^3$, $R^4$, $R^5$, $R^6$, which can be identical or different, are $—CH_3$, $—CF_3$, $—OCH_3$, $—F$, $—Cl$, $—Br$ or $—H$, and X can be $—O—$, $—C(CH_3)_2—$, $—C(CF_3)_2—$, $—SO—$, $—CO—$, $—CH_2—$ or the radical

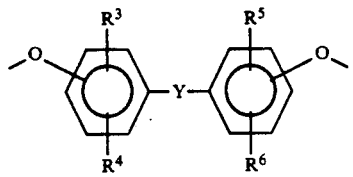

where $R^3$ to $R^6$ are as defined above and Y is $—C(CH_3)_2—$, $—C(CF_3)_2—$, $—SO_2—$, $—CO—$, $—CH_2—$, or $—O—$, or G is

in which $G^1$ can have the meanings mentioned above for G.

The polymers according to the invention which have structural units of the formula I can be either homocondensation products which contain only identical structural units of the formula I or cocondensation products consisting of different structural units of the formula I. Preference is given to copolyamides which contain different structural units of the formula I in a preferably random distribution.

The invention further relates to polymers consisting of cocondensation products which have at least 10 mol %, relative to the polymer, of structural units of the formula I, which can be identical to or different from one another, and structural units of the formula II

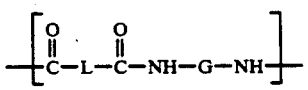
(II)

in which L is

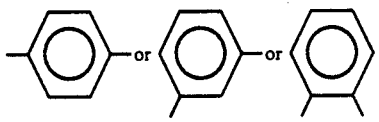

and G has the meaning as in formula I.

The molar ratio of the structural units of the formulae I:II in the copolyamides, preferably in random distribution of the structural units, is preferably in the range of 1:9 to 9.5:0.5, in particular 1:9 to 1:8.

The limiting viscosity number $[\eta]$, which can be determined by known measurement methods using solutions of the polymers, can be used as a measure for the molecular weight of the polymers. The limiting viscosity number $[\eta]$ of the polyamides or copolyamides according to the invention can be varied within a wide range. It is preferably 0.2 to 5 dl/g, in particular 0.4 to 4.2 dl/g, measured in N-methylpyrrolidone (NMP) solution at 25° C.

The polyamides and copolyamides according to the invention can be synthesized by reaction of suitable monomers by standard methods. Preferably, the corresponding acid chlorides can, for example, be reacted with the corresponding amines in the presence of solvents, such as, for example, N-methylpyrrolidone or dimethylacetamide, at temperatures which may rise up to about 80° C. For certain monomer combinations, it is also possible to carry out, for example, a condensation reaction of the melt at higher temperatures.

Polyamides and copolyamides according to the invention which contain structural units of the formula I have relatively high glass temperatures ($T_G$), which are preferably higher than 200° C., and enhanced partial crystallinity. Both properties have an advantageous effect on the use according to the invention of these polyamides as orientation layers. Analogous behavior is also displayed by copolyamides according to the invention which contain structural units of the formulae I and II.

Orientation layers according to the invention are not attacked by conventional liquid crystal substances, and the cured orientation layers have smooth, defect-free surfaces without cracks or other inhomogeneities. The layers can be produced from polyamide solutions, for example in N-methylpyrrolidone, which have polymer contents of about 0.1 to 5% by weight. These solutions are inert and very stable on storage. Under certain conditions, the so-called wet films produced from the polyamide solutions at temperatures as low as under 100° C., since they are not reactive and do not have to be modified chemically.

The orientation effect was tested using LCD cells whose orientation layer had been produced from polyamides according to the invention which contain structural units of the formula I. To this end, the maximum light extinction of the filled cell is measured between crossed polarizers. The contrast values obtained by dynamic electrical activation are a measure of the quality of the orientation efficiency. In addition, the visual impression obtained using a polarizing microscope is also used for evaluating the contrasting capability. Surprisingly, particularly high contrast values were obtained with orientation layers produced by means of the polyamides according to the invention which contained recurring structural units of the formula I, not only with ferroelectric but also with smectic A and with nematic cell types, compared with orientation layers of comparable aromatic polyamides of the prior art.

The invention will be illustrated in more detail by the examples which follow.

EXAMPLE 1

Preparation of a polyamide containing structural units of the formula

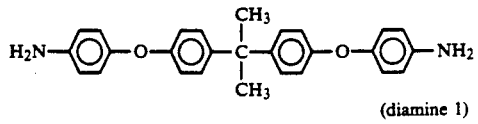

(diamine 1)

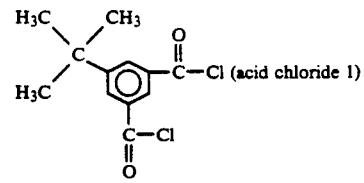

(acid chloride 1)

In a stirred apparatus, 82.11 g of diamine 1 are dissolved in 1000 g of dry N-methylpyrrolidone (NMP), and then 51.83 g of acid chloride 1 are metered into the solution with stirring over a period of 1 hour, while simultaneously heating the solution from 15° C. to 70° C. The resulting clear solution is stirred at 70° C. for another hour. Preferably, the polycondensation reactions are carried out according to the invention with a slight excess of diamine and, after the reaction is completed, stopped by adding a small amount of benzoyl chloride, so that the resulting polymer preferably consists of linear macromolecular polycondensation polyamides which have benzoylated amino end groups on both ends of the molecule. The reaction mixture is then neutralized by addition of 13 g of CaO and stirred for another hour.

The filtered reaction solution is coagulated by addition of water, the precipitated polymer is washed several times with water and acetone and then dried in vacuo (about 50 mbar) and a weak nitrogen stream at 180° C. to a constant weight.

A glass temperature ($T_G$) of 255° C. was determined for the polyamide obtained by means of DSC and torsional pendulum measurements. A partial crystallinity of 30% by weight, relative to the polyamide, could be determined by X-ray measurements. It can be shown by means of DSC measurements that the crystallites do not Starting components:

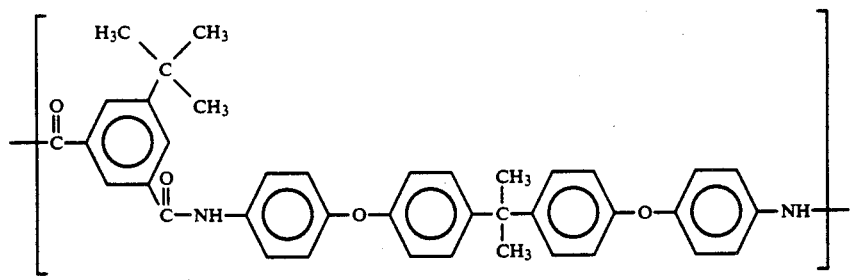

melt below 400° C. The limiting viscosity number [$\eta$] of the polyamide is 1.5 dl/g, measured in NMP at 25° C.

EXAMPLE 2

Preparation of a polyamide containing structural units of the formula

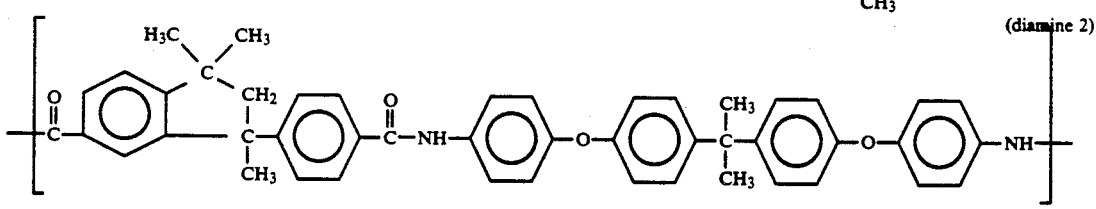

Starting components:
a) Diamine 1 from Example 1

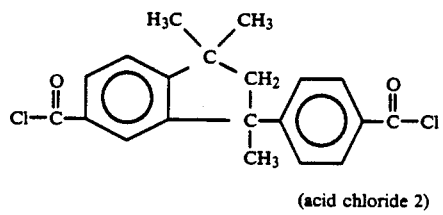

(acid chloride 2)

Analogously to Example 1, 82.11 g of diamine 1 from Example 1 are dissolved in 1000 g of dry NMP, and 72.05 g of acid chloride 2 are then metered into the solution with stirring over a period of one hour, while simultaneously heating the solution from 15° C. to 70° C. The resulting clear solution is further processed as described in Example 1, and the polyamide formed is isolated, washed and dried. A glass temperature ($T_G$) of 265° C. was determined by means of DSC and torsional pendulum measurements. The limiting viscosity number [$\eta$] of the polyamide is 0.8 dl/g, measured in NMP at 25° C.

EXAMPLE 3

Preparation of a polyamide containing structural units of the formula

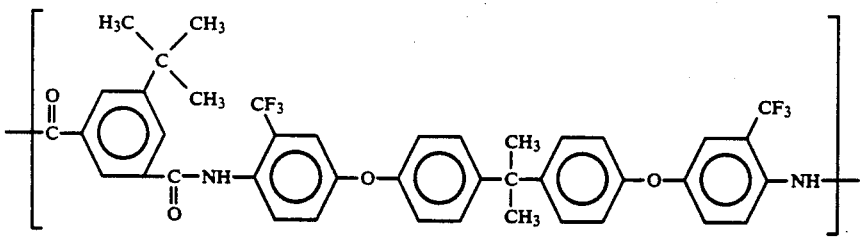

Starting components:
a) Acid chloride 1 from Example 1 b)

Analogously to Example 1, 109.3 g of diamine 2 from Example 1 are dissolved in 1000 g of dry NMP, and 51.83 g of acid chloride 1 from Example 1 are then metered into the solution with stirring over a period of one hour, while simultaneously heating the solution from 15° C. to 70° C. The resulting clear solution is further processed as described in Example 1, and the polyamide formed is isolated, washed and dried. A glass temperature ($T_G$) of 250° C. was determined by means of DSC and torsional pendulum measurements. The limiting viscosity number [$\eta$] of the polyamide is 0.7 dl/g, measured in NMP at 25° C.

Comparative Example 1

The glass temperature ($T_G$) of a polyamide comparable to the polyamide of Example 1 and containing structural units of the formula (a) of the prior art described above, which was prepared and tested analogously to Example 1 by replacing diamine 1 by a diamine derived from formula (a), is only 240° C., at a much lower partial crystallinity of about 5% by weight. The limiting viscosity number [$\eta$] of the polyamide is 2.0 dl/g, measured in NMP at 25° C.

EXAMPLE 4

Preparation of a copolyamide containing randomly distributed structural units of the formulae

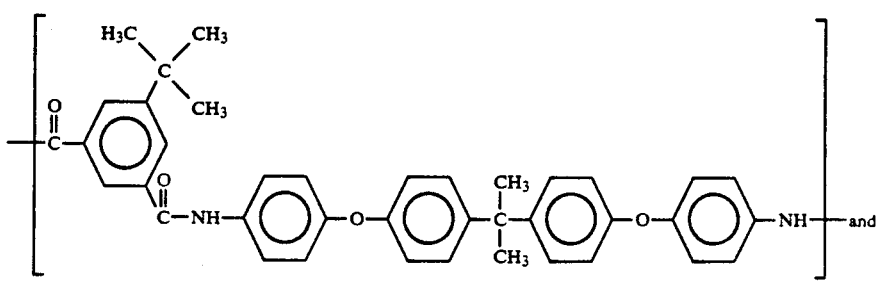

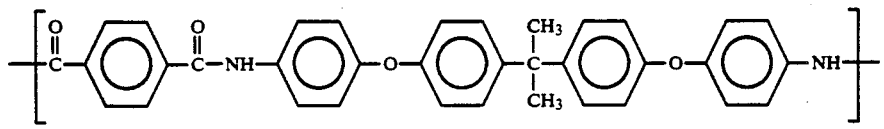

in a molar ratio of 1:1.
Starting components:
a) Diamine 1 from Example 1
b) Acid chloride 1 from Example 1

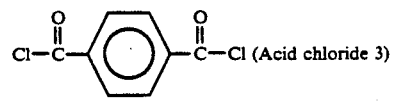

Analogously to Example 1, 82.11 g of diamine 1 from Example 1 are dissolved in 1000 g of dry NMP, and a mixture of 25.92 g of acid chloride 1 from Example 1 and 20.31 g of acid chloride 3 are then metered into the solution with stirring over a period of one hour, while simultaneously heating the solution from 15° C. to 70° C. The resulting clear solution is further processed as described in Example 1, and the copolyamide formed is isolated, washed and dried. A glass temperature ($T_G$) of 225° C. was determined by means of DSC and torsional pendulum measurements. The limiting viscosity number [$\eta$] of the polyamide is 4.1 dl/g, measured in NMP at 25° C.

EXAMPLE 5

Preparation of polymer layers on glass supports

1% strength by weight solutions of each of the polymers of Examples 1 to 4 in anhydrous NMP are applied in various layer thicknesses to different glass supports. The application is in each case effected by conventional spin-coating (for 30 seconds) at different rotational speeds, which produces, on the glass supports, wet films of different thickness, which are subsequently dried at 150° C. for 2 hours. This gives defect-free homogeneous polymer layers having the following thicknesses:

---
12 nm at 3000 revolutions/minute
30 nm at 1000 revolutions/minute
60 nm at 500 revolutions/minute
---

EXAMPLE 6

Preparation of polymer layers on glass supports coated with indium/tin oxide

3% strength by weight solutions of each of the polymers of Examples 1 to 4 in anhydrous NMP are spin-coated in various layer thicknesses onto different glass supports coated with indium/tin oxide as described in Example 5 by varying the number of revolutions, and the wet films formed are then dried at 150° C. for 2 hours. This gives defect-free, homogeneous polymer layers which have the following thicknesses:

---
300 nm at 1000 revolutions/minute
100 nm at 3000 revolutions/minute
70 nm at 5000 revolutions/minute
---
50 nm at 7000 revolutions/minute
---

EXAMPLE 7

Contrast power test 1.5% strength by weight solutions of each of the polymers of Examples 1 to 4 in anhydrous NMP are spin-coated at 2000 revolutions/minute for 30 seconds onto glass supports coated with indium/tin oxide, and the wet films formed are subsequently dried at 150° C. for 2 hours. The polymer layers obtained are then slightly stroked 2 times each in the same direction by means of a stroking machine. Two each of the test glass supports thus obtained and coated with the same polymer are placed parallel and antiparallel on top of each other and their orientation effect is tested by means of the nematic room temperature mixture ZLI 1565 (from E. Merck). In each case, they give completely homogeneous planar orientations, which can be detected by full extinction of the light between crossed polarizers at a suitable rotation of the cell (i.e. the stroking direction is parallel to the vibrational direction of one of the two polarizers). The contrast values determined in a conventional manner are summarized in Table 1 below.

The contrast values reproduced in Table 1 show the superiority of orientation layers consisting of the polyamides according to the invention of Examples 1 to 4 compared with the polyamide of Comparative Example 1 which contains structural units of the formula (a) of the prior art.

TABLE 1

| Orientation layer consisting of the polyamide of | Contrast value |
|---|---|
| Example 1 | 55:1 |
| Example 2 | 65:1 |
| Example 3 | 60:1 |
| Example 4 | 55:1 |
| Comparative Example 1 | 20:1 |

EXAMPLE 8

1.5% strength by weight solutions of each of the polymers from Example 1 and 2 in anhydrous NMP are prepared, and 0.2% by weight, relative to the solution, of $\gamma$-aminopropyltriethoxysilane is added to the solution. The solutions thus obtained are then each spin-coated at 3000 revolutions/minute for 30 seconds onto glass supports or glass supports coated with indium/tin oxide, and the wet films formed are subsequently dried at 90° C. in a vacuum drying cabinet. Despite the low drying temperature of 90° C., the polymer layers according to the invention have very good adhesion not only on glass supports but also on glass supports coated with indium/tin oxide.

EXAMPLE 9

To demonstrate the advantageous use of the polyamides according to the invention as orientation layers in electrooptical switching and display elements, a twisted nematic cell of the Schadt-Helfrich type (cf. M. Schadt, W. Helfrich, Appl. Phys. Lett. 18 (1971) 127) is manufactured. For this purpose, an electrode area of 4×4 mm which is coated with indium/tin oxide is in each case constructed on glass supports, cleaned, dried and, as described in Example 7, coated with the polymer according to the invention from Example 2 and stroked. Two each of the coated glass supports thus obtained are glued, through the use of spacers, to a cell which has an inner electrode distance of 10.4 μm and in which the stroking directions on the polymer surfaces of the two glass supports are twisted by 90° with respect to one another. The nematic room temperature mixture ZLI 1565 (from E. Merck), to which 0.1% by weight, relative to ZLI 1565, of a chiral doping substance has been added, is poured into the cell, and the electrooptical effect is tested and demonstrated by applying or switching off a voltage. If orientation layers consisting of the polyamide of Example 2 are used, the threshold voltage $U_{10}$ is 2.4 volt (10% increase in intensity) and the ratio $U_{90}/U_{10}$ is 1.44 (at 25° C.).

EXAMPLE 10

To test the advantageous use of the polyamides according to the invention as orientation layers in ferroelectric displays, a cell is manufactured, as described in Example 9, by using the polymer according to the invention from Example 2, except that the stroking distances on the polymer surfaces of the two glass supports are parallel to one another and the electrode distance is 3.2 μm. A ferroelectric test mixture is poured into the cell, and the bistability and switching times are determined to give the following result:

Switching times (25° C.):

Time for square voltage to increase from 10 to 90% ($\pm 10V/\mu m$)=70 μsec

Critical pulse range at 10 V/μm=130 μsec

Bistability was demonstrated for a period of at least one second, i.e. more than fifty times the usual cycle times of displays (20 msec).

We claim:

1. An orientation layer in liquid crystal display elements and liquid crystal switching elements, comprising substituted aromatic polyamides wherein the polyamides contain structural units of the formula I

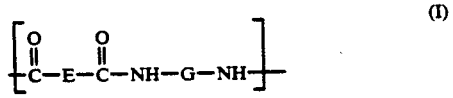

(I)

in which in formula I the units E and G have the following meaning:

E is

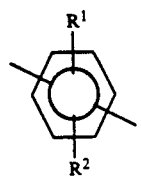

where $R^1$, $R^2$, which can be identical or different, are H, ($C_1$-$C_6$)-alkyl or ($C_1$-$C_6$)-alkoxy, with the proviso that at least one of the radicals $R^1$ or $R^2$ contains a tertiary substituted carbon atom, preferably the group —C(CH$_3$)$_3$, or E is

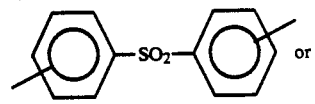

or

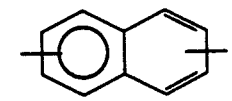

or

E is

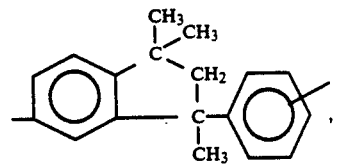

and

G is

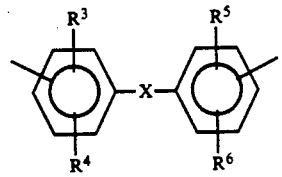

where $R^3$, $R^4$, $R^5$, $R^6$, which can be identical or different, are —CH$_3$, —CF$_3$, —OCH$_3$, —F, —Cl, —Br or —H, and X can be —O—, —C(CH$_3$)$_2$—, —C(CF$_3$)$_2$—, —SO$_2$—, —CO—, —CH$_2$— or the radical

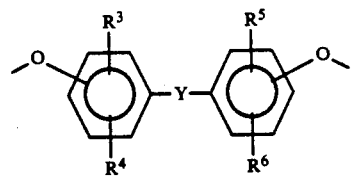

where $R^3$ to $R^6$ are as defined above and Y is —C(CH$_3$)$_2$—, —C(CF$_3$)$_2$—, —SO$_2$—, —CO—, —CH$_2$—, or —O—, or G is

in which $G^1$ can have the meanings mentioned above for G.

2. The orientation layer as claimed in claim 1, where the polyamides are copolymers which contain at least 10 mol %, relative to the copolymer, of structural units of the formula I and structural units of the formula II and G has the meaning as in formula I.

3. The orientation layer as claimed in claim 1 wherein the polyamides contain structural units of the formula

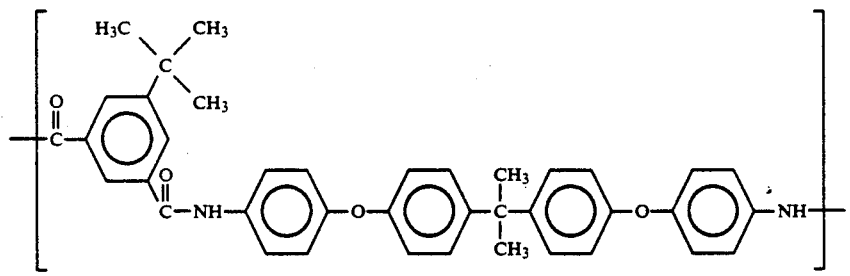

4. The orientation layer as claimed in claim 1 wherein the polyamides contain structural units of the formula

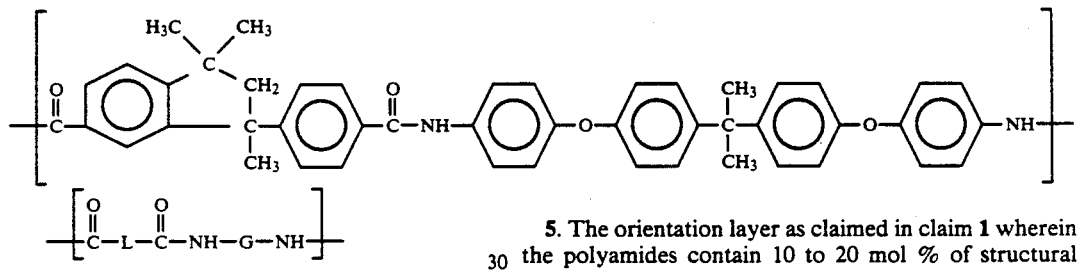

in which L is

5. The orientation layer as claimed in claim 1 wherein the polyamides contain 10 to 20 mol % of structural units of the formula

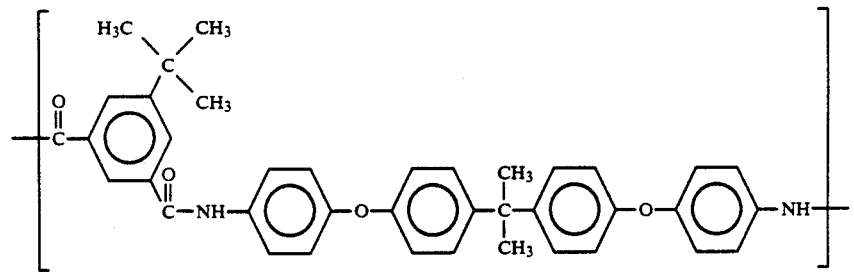

and 90 to 80 mol % of structural units of the formula

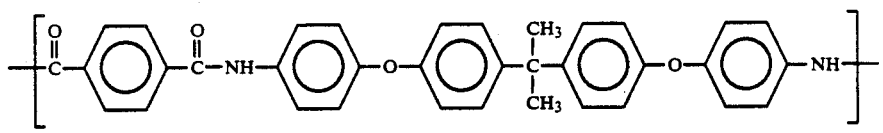

6. The orientation layer as claimed in claim 1 wherein the polyamides contain 10 to 20 mol % of structural units of the formula

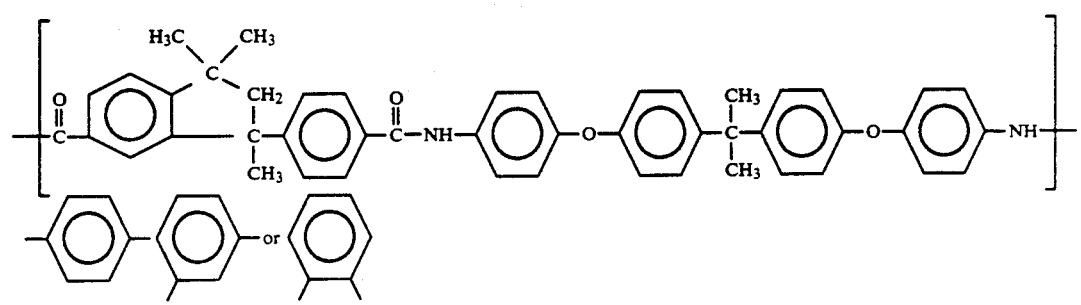

and 90 to 80 mol % of structural units of the formula

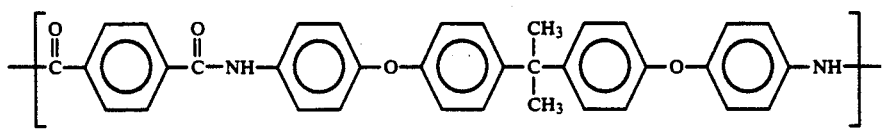
7. An electrooptical liquid crystal display element or liquid crystal switching element which contains polymers of aromatic polyamides as claimed in claim 1 as orientation layer for the liquid crystals.
8. The orientation layer as claimed in claim 1 wherein the polyamides contain structural units of the formula
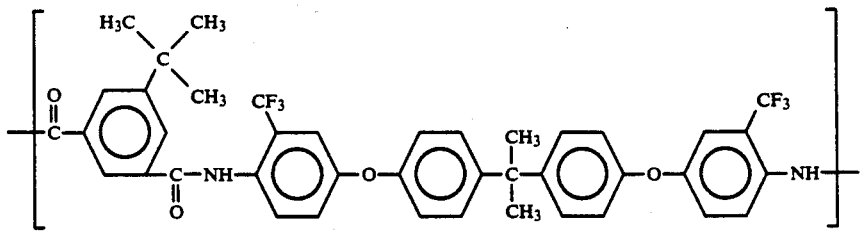
* * * * *